United States Patent [19]

Ottewell

[11] 4,343,382
[45] Aug. 10, 1982

[54] FRICTION PAD ASSEMBLIES FOR RAIL VEHICLE BRAKES

[75] Inventor: Gerald A. Ottewell, Solihull, England

[73] Assignee: Lucas Industries Limited, Birmingham, England

[21] Appl. No.: 108,671

[22] Filed: Dec. 31, 1979

[30] Foreign Application Priority Data

Jan. 18, 1979 [GB] United Kingdom ................ 7902044

[51] Int. Cl.³ .............................................. F16D 65/004
[52] U.S. Cl. ..................................... 188/242; 188/246
[58] Field of Search ............................... 188/234–242, 188/250 G, 73.1, 250 B, 244, 245, 246, 59, 74, 151 R, 206 R, 250 R, 193, 261

[56] References Cited

U.S. PATENT DOCUMENTS

1,079,570  11/1913  McClarkey ...................... 188/242 X

FOREIGN PATENT DOCUMENTS

127458  3/1932  Austria .................................. 188/234
2152315  4/1973  Fed. Rep. of Germany ... 188/250 G
475562  1/1936  United Kingdom ................ 188/234

*Primary Examiner*—Joseph F. Peters, Jr.
*Assistant Examiner*—M. J. Hill
*Attorney, Agent, or Firm*—Scrivener, Clarke, Scrivener and Johnson

[57] ABSTRACT

A friction pad assembly for rail vehicle brakes comprises a pad of friction material carried by a rigid backing plate, and the backing plate is detachably mounted on a shoe. A keeper is provided which includes a clamping member pivotally mounted on one end of the shoe. The clamping member has a clamp face which acts on one end of the backing plate to urge the backing plate into engagement with the shoe. The clamping member is urged into an operative clamping position by a wedge which is releasably driven between the clamping member and a relatively stationary surface in a block which is either integral with, or releasably attached to, the shoe.

6 Claims, 3 Drawing Figures

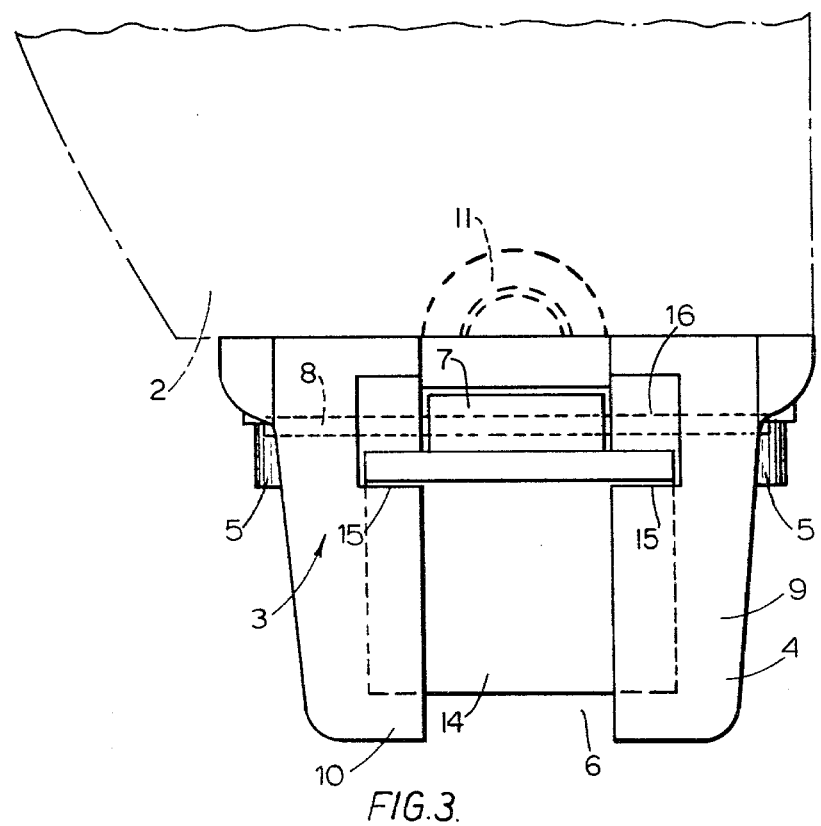

FRICTION PAD ASSEMBLIES FOR RAIL VEHICLE BRAKES

SPECIFIC DESCRIPTION

This invention relates to friction pad assemblies for rail vehicle brakes of the kind in which a pad of friction material is carried by a rigid backing plate, and the backing plate is detachably mounted on a shoe by means of which the pad can be applied to a rotatable disc or wheel in a brake.

Numerous constructions of friction pad assemblies for rail vehicle brakes have been proposed with a view to ensuring that backing plates can be readily detachable from shoes for pad replacement without having in any other way to dismantle the brake. In most known constructions the backing plate is retained against movement with respect to the shoe between an abutment at one end of the shoe and a keeper which is detachably secured to the shoe at the other end. Opposite ends of the backing plate co-operate with the abutment and the keeper so that upon removal of the keeper, for example by the removal of two bolts, the backing plate can be detached from the shoe, simply by sliding it over the shoe to disengage the backing plate from the abutment. When the assembly is installed in a brake, after removal of the keeper, which may be difficult if the bolts have seized, the pad can be withdrawn through an end of the brake in a chordal direction. In some known constructions difficulty is experienced in compensating for tolerance variations which may affect the distance between the abutment and the keeper, and between opposite ends of the backing plate. Thus, even when the keeper is firmly attached to the shoe, the backing plate can move relative to the shoe through a short distance sufficient to cause rattle in a "brakes-off" condition, and impact noise with the abutment or keeper when the brake is applied.

According to our invention in a friction pad assembly of the kind set forth a keeper for engagement with one end of the rigid backing plate comprises a clamping member which is pivotally mounted on one end of the shoe for movement between an operative clamping position to urge the backing plate into engagement with the shoe and a retracted position spaced from the operative position in which the friction pad and the backing plate can be removed from the shoe, and a wedge is provided for urging the clamping member into the operative clamping position, the wedge being releasably driveable between the clamping member and a relatively stationary surface.

My construction facilitates installation and maintenance since only the wedge has to be removed to enable a friction pad to be replaced.

The clamping member has a clamp face for engagement with the backing plate and, preferably, that face is inclined in such a direction as to impart a wedge action to the backing plate to urge it towards the shoe at that end and enhance the force urging the opposite end of the backing plate against an abutment on the shoe and with which the opposite end of the backing plate is engageable.

The clamping member is pivotally mounted by means of a pin between spaced lugs of a mounting block which may be integral with, or releasably attached to, the shoe, and the wedge acts between the clamping member and a bearing face or faces in the block.

The pin may be of rigid construction or it may comprise a resilient roll pin to exert a resilient force on an abutment at the end of the shoe remote from the keeper.

One embodiment of our invention is illustrated in the accompanying drawings in which:

FIG. 3 is a plan view of said keeper looking in the direction of arrows 3—3 in FIG. 1.

Figure 1:
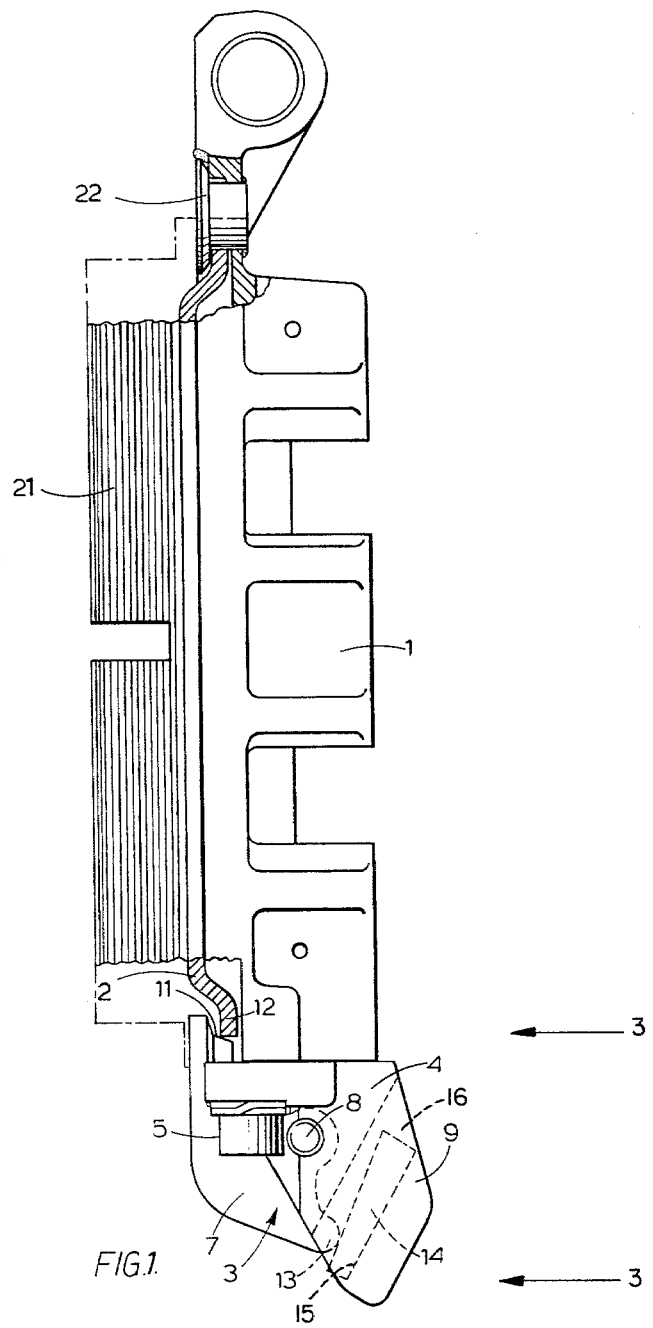
FIG. 1 is a side elevation, partly in section, of a friction pad assembly for a rail vehicle brake and incorporating the keeper of the invention.
Figure 2:
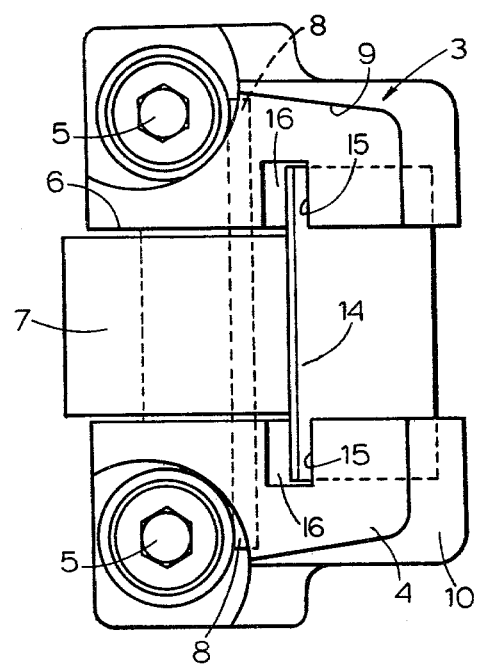
FIG. 2 is an end view of said keeper.

The friction pad assembly illustrated in the drawings comprises a rigid shoe 1 on which is detachably mounted a backing plate 2 carrying a pad 21 of friction material on its face remote from the shoe 1. One end of the backing plate 2 detachably co-operates with a fixed abutment at an adjacent end of the shoe 1, suitably a headed stud 22 in a known manner, and the backing plate 2 is also detachably secured to the shoe 1 by means of a keeper constructed in accordance with the invention and generally indicated by the numeral 3.

The keeper 3 comprises a metal mounting block 4, suitably cast iron, which is rigidly secured detachably to the adjacent end of the shoe 1 by means of a pair of spaced bolts 5. The block 4 is provided with a longitudinally extending slot 6 in which a clamping member 7 is rotatably mounted on a transverse pivot pin 8 of which opposite ends are received in spaced lugs 9 and 10 on opposite sides of the slot 6.

The clamping member 7 has a clamp face 11 at one end for engagement with an adjacent end of the backing plate 2. The clamp face 11 is of partcircular outline and, as illustrated, is also inclined in a direction to co-operate with a locally depressed region 12 of complementary outline in the backing plate 2 to urge that part of the backing plate 2 into engagement with the shoe 1 and, at the same time, clamp the opposite end of the backing plate 2 against the headed stud 22.

The opposite end of the clamping member 7 has a rounded nose 13 and a wedge 14 engages with the nose 13 to rotate the clamping member 7 about the pin 8 and into an operative clamping position in which the depressed region 12 engages with the shoe 1 as described above.

The wedge 14 is driven between the rounded nose 13 and aligned bearing faces 15 in slots 16 in lugs 9, 10, and aligned transversely across the slot 6 and into the lugs 9, 10. The wedge 14 is driven into the slot 16 from the side of the block 4 remote from the backing plate 2 in order to urge the clamping member 7 angularly towards its operative position.

To remove the backing plate 2 from the brake for pad replacement or other maintenance, the wedge 14 is simply driven out of the slots 16 in the opposite direction. The clamping member 7 can then be rotated about the pin 8 and into a retracted position in which the clamp face 11 does not contact the backing plate 2.

The engagement between the wedge 14, the nose 13, and the bearing faces is chosen to ensure that the wedge 14 cannot accidentally be removed from the brake in service after it has been driven home.

The pivot pin 8 may be of rigid construction. Preferably, however, the pin 8 is in the form of a resilient roll pin so that a resilient loading is imparted through the backing plate 2 to the fixed abutment.

In a modified construction the block 4 is integral with the shoe 1.

I claim:

1. A friction pad assembly for a rail vehicle brake, comprising a shoe, a rigid backing plate detachably mounted on said shoe, a pad of friction material carried by said backing plate, and a keeper for engagement with one end of said backing plate, said keeper comprising a clamping member, wherein a pivotal connection pivotally mounts said clamping member on one end of said shoe for movement between an operative clamping position to urge said backing plate into engagement with said shoe and a retracted position spaced from said operative position in which said friction pad and said backing plate can be removed from said shoe, the friction pad assembly further comprising a mounting block provided on said shoe, said mounting block having spaced lugs and a bearing face, and said pivotal connection comprises a pin by means of which said clamping member is pivotally mounted between said spaced lugs, a wedge for urging said clamping member into said operative clamping position, said wedge being movable between an operative wedging position in which said wedge is releasably driven between said clamping member and said bearing face, and a retracted position in which the wedge is removed from engagement with said clamping member and said bearing face to enable said clamping member to be pivoted out of its operative clamping position and said friction pad and said backing plate can be removed from said shoe.

2. A friction pad assembly as claimed in claim 1, wherein said clamping member has a clamp face for engagement with one end of said backing plate.

3. A friction pad assembly as claimed in claim 2, wherein an abutment is provided on said shoe at an end remote from said keeper, and said backing plate has an opposite end for engagement with said abutment, said clamp face being inclined in such a direction as to impart a wedge action to said one end of said backing plate to urge it towards said shoe at that end and enhance a force urging said backing plate against said abutment at said opposite end.

4. A friction pad assembly as claimed in claim 3, wherein said clamp face is of part-circular outline for co-operation with a locally depressed region of complementary outline in said backing plate.

5. A friction pad assembly as claimed in claim 1, wherein said block is rigidly secured detachably to said shoe.

6. A friction pad assembly as claimed in claim 1, wherein said pin comprises a resilient roll pin.

* * * * *